(12) United States Patent
Schneider

(10) Patent No.: US 6,487,929 B2
(45) Date of Patent: Dec. 3, 2002

(54) ARRANGEMENT FOR ROTATABLY SUPPORTING AN ELEMENT ROTATABLE ABOUT AN AXIS

(75) Inventor: Franz-Josef Schneider, Wilhelmsthal (DE)

(73) Assignee: Dr. Franz Schneider Kunststoffwerke GmbH & Co. KG, Kronach-Neuses (DE)

( * ) Notice: Subject to any disclaimer, the term of this patent is extended or adjusted under 35 U.S.C. 154(b) by 22 days.

(21) Appl. No.: 09/783,785

(22) Filed: Feb. 15, 2001

(65) Prior Publication Data

US 2002/0069720 A1 Jun. 13, 2002

(30) Foreign Application Priority Data

Dec. 8, 2000 (DE) .......................................... 100 61 030

(51) Int. Cl.$^7$ ................................................. G05G 5/06
(52) U.S. Cl. ........................... 74/527; 74/553; 403/324; 403/325
(58) Field of Search ........................... 74/527–531, 553, 74/551.1, 502.4, 502.6; 403/321, 322.1, 324, 325, 46; 188/325

(56) References Cited

U.S. PATENT DOCUMENTS

| | | | | |
|---|---|---|---|---|
| 2,706,774 A | * | 4/1955 | Bowman | 116/DIG. 39 |
| 4,385,849 A | * | 5/1983 | Crain | 343/901 |
| 4,660,286 A | * | 4/1987 | Engelbrecht et al. | 30/276 |
| 5,960,912 A | * | 10/1999 | Nishizawa et al. | 188/1.11 E |

FOREIGN PATENT DOCUMENTS

EP 0 645 555 B1 3/1995

* cited by examiner

*Primary Examiner*—Charles A Marmor
*Assistant Examiner*—Dennis Abdelnour
(74) *Attorney, Agent, or Firm*—Hoffmann & Baron, LLP

(57) ABSTRACT

A braking arrangement for rotatably supporting an element rotatable about an axis such as a control wheel, rotary control knob or the like, for example for a vehicle fresh air nozzle, has a plug-shaped casing with an end portion and a peripherally extending flange extending away from the end portion and having a circular external peripheral surface. The external surface of the flange forms a rotary mounting surface for the rotatable element. The flange encloses a central guide space for two braking members which have braking portions facing diametrally away from each other. The braking portions extend through transverse holes in the flange. The two braking members are urged away from each other by a spring disposed therebetween.

8 Claims, 2 Drawing Sheets

ARRANGEMENT FOR ROTATABLY SUPPORTING AN ELEMENT ROTATABLE ABOUT AN AXIS

FIELD OF THE INVENTION

The invention concerns an arrangement for rotatably supporting an element rotatable about an axis.

By way of example, such an element may be an operating or control wheel, a rotary control knob, a roller or the like component, more especially and by way of example for a fresh air intake nozzle for a vehicle.

BACKGROUND OF THE INVENTION

One of the major problems encountered in a situation such as the production of fresh air intake nozzles for vehicles is that of reliably observing and maintaining the required torques and operating forces at the operating or control wheels, rotary control knobs, the guide plates of rolling units which are provided for guiding and deflecting the air flow into the vehicle, and so forth, in a temperature range of between −40° C. and +100° C. That wide temperature range involves variations in the dimensions of such elements, due to the temperatures acting thereon, and such dimensional variations influence the torques and operating forces required. That in turn means that the degree of constancy in the torques and operating forces concerned hitherto can leave something to be desired, when such a wide temperature range is taken into consideration.

SUMMARY OF THE INVENTION

An object of the present invention is to provide an arrangement for rotatably supporting an element rotatable about an axis, which is capable of affording at least substantially constant torques and operating forces within a wide temperature range of for example between −40° C. and +100° C.

Another object of the present invention is to provide an arrangement for rotatably supporting a rotatable control or operating element, which is so designed as to provide a compensating effect in regard to temperature-induced influences on the rotatable element.

Still another object of the present invention is to provide an arrangement for rotatably supporting a rotatable control or operating element, which while being of a simple structure provides for a uniform force needing to be applied to the element for rotation thereof.

In accordance with the principles of the present invention the foregoing and other objects are attained by an arrangement for rotatably supporting an element rotatable about an axis, for example a control or actuating wheel, a rotary control knob, a roller unit or the like, for example for a fresh air intake nozzle for a vehicle, wherein a casing of a generally plug-shaped configuration adapted to be fitted to a mounting portion, for example a part of a vehicle as referred to above, has an end portion and a peripherally extending flange thereon, which extends away from the end portion in the axial direction of the casing, providing a circular external peripheral surface to form a rotational mounting surface for the rotatable element. The flange defines therewithin a guide space and the flange has first and second diametrally mutually oppositely disposed holes therethrough. First and second braking members are disposed in the guide space and have braking portions which face diametrally away from each other and extend through respective ones of the holes in the flange. A spring member is operatively disposed between the first and second braking members and urges the braking members away from each other.

The braking portions can thus project radially outwardly beyond the external peripheral surface of the casing and come into engagement with a surface of the rotatable element to apply a braking effect thereto. The spring member between the two braking members can thus afford, independently of the temperature involved, a constant braking force and thus a constant torque which is independent of temperature or an operating force which is independent of temperature for actuating the element which is thus supported rotatably at the stationary immobile casing forming the axis of rotation for the element. All this has an advantageous effect in terms of operating comfort and convenience.

In a preferred feature of the invention, the transverse holes in the flange of the casing steplessly adjoin the end portion of the casing, because then the braking portions of the two braking members can be so designed and dimensioned as to afford the largest possible braking areas.

A further preferred feature of the invention provides that the transverse holes in the flange are of an internal cross-section which is adapted to the cross-section of the braking portions of the braking members. That provides for optimum guidance in terms of mobility of the braking members in the casing.

Another preferred feature of the arrangement according to the invention provides that each braking member has a guide and abutment portion which adjoins its braking portion and which is guided in the guide space of the casing. Besides reliable linearly movable guidance for the braking members, the guide and abutment portion also advantageously means that the braking members are arranged in the casing, in such a way that they can be reliably arranged therein and therefore cannot easily go missing.

A further preferred feature of the arrangement provides that the guide space in the casing has first and second mutually parallel and oppositely disposed guide surfaces at which the braking members are linearly movably guided with their guide and abutment portion. Such a configuration affords the advantage that the casing and the braking members are simple to produce and the braking members can be easily disposed in the casing.

In a further preferred feature the flange of the casing of the arrangement of the invention has a peripherally extending collar, at the upper edge of the casing flange which is in axially opposite relationship to the end portion of the casing. That makes it possible for the arrangement to be accurately fitted in position in a simple and time-saving manner. When fitting the arrangement, the collar forms a support configuration which permits precisely correct positioning of the casing and thus the braking members, in relation to the element which is to be supported and braked thereby, in a simple procedure.

Still another preferred feature of the invention provides at least first and second resilient snap members integrally disposed on the collar and projecting in the same direction away therefrom. That provides for ease of fitting and fixing the arrangement according to the invention to an appropriate part of a vehicle.

Further objects, features and advantages of the invention will be apparent from the description hereinafter of a preferred embodiment.

DESCRIPTION OF THE PREFERRED EMBODIMENT

Figure 1:
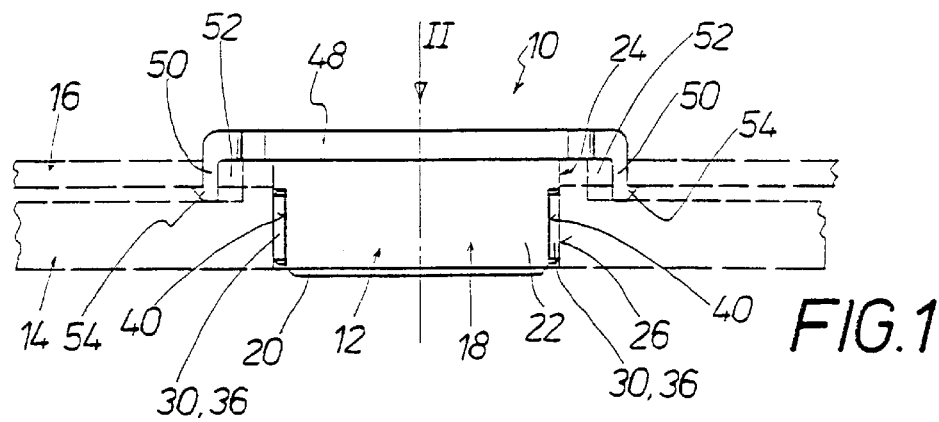
FIG. 1 is a side view of the arrangement in combination with a rotatable element and a stationary portion to which the arrangement is mounted, only parts of the rotatable element and the stationary portion being shown in section.

Referring firstly to FIG. 1, shown therein is an embodiment of the braking arrangement generally indicated at 10 for rotatably supporting about an axis indicated at 12 a rotatable element indicated at 14. The element 14 which can be for example an operating or control wheel, a rotary control knob, a roller unit or the like, more especially for a fresh air intake nozzle for a vehicle, is shown in longitudinal section in respect of a part thereof in FIG. 1. The axis 12 is fixed in relation to a portion 16 of which only a part is shown in FIG. 1, in longitudinal section. The portion 16 is a component which is fixed with respect for example to the vehicle to which the arrangement 10 is mounted.

The axis 12 is defined by a generally plug-shaped casing 18 as is also clearly apparent from FIGS. 2 through 5 in which the same features are denoted by the same references as in FIG. 1. The plug-shaped casing 18 which can thus be fitted with a plug-in action into a suitable opening in the portion 16 of the vehicle or like structure has a bottom or end portion 20, and a peripherally extending flange 22 which extends away from the end portion 20, in the generally axial direction of the casing 18. The peripherally extending flange 22 has a circular external peripheral surface 24 which forms a rotational mounting surface 26 defining the axis 12, for the rotatable element 14. The rotatable element 14 is formed with a corresponding circular rotational mounting surface 26, in other words, the diameter of the rotational mounting 26 is adapted or matched to the diameter of the circular external peripheral surface 24 of the flange 22, with a defined tolerance, thereby to permit the rotatable element 14 to appropriately rotate on the rotational mounting surface on the casing 18.

The casing 18 is formed therein with a central guide space 28 which is open at one end, that is to say it is closed off at the other end by the end portion 20. The guide space 28 accommodates first and second braking members 30. The central guide space 28 has first and second guide surfaces 32 which are disposed in mutually parallel and opposite relationship and along which the braking members 30 are linearly movably guided with a respective guide and abutment portion 34 thereof. Each of the two braking members 30 also has a braking portion 36 which adjoins the respective guide and abutment portion 34 at the outward side thereof. The widthwise dimensions of the braking portion 36 of each braking member 30 are smaller than the widthwise dimensions of the associated guide and abutment portion 34. That configuration thus affords abutment surfaces on the braking members 30, as can be clearly seen for example at 38 in FIGS. 2 and 5. The abutment surfaces 38 delimit in a clearly defined manner the linear mobility of the braking members 30 relative to the casing 18.

The peripherally extending flange 22 of the casing 18 is formed with first and second diametrally mutually oppositely disposed transverse holes 40 which extend through the flange 22. The braking members 30 each extend through a respective one of the holes 40, with their respective braking portion 36.

Figure 2:
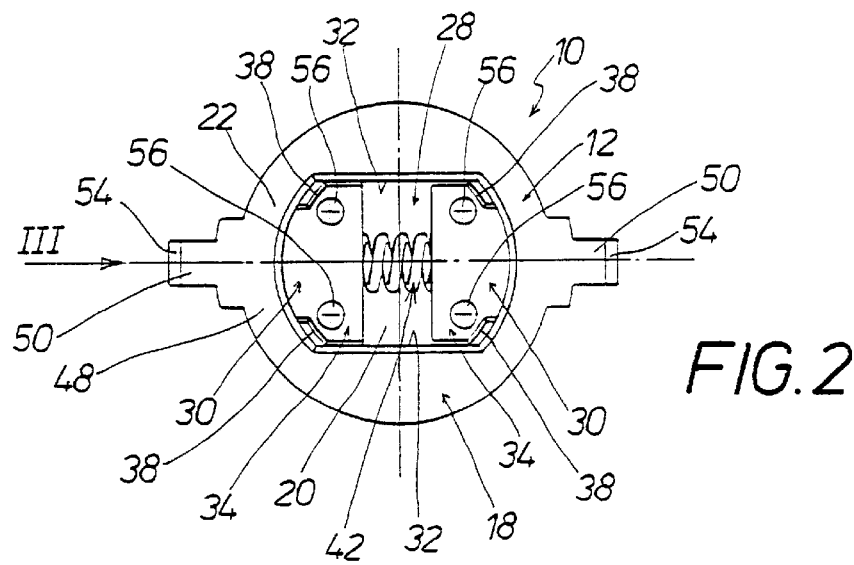
FIG. 2 is a view of the arrangement illustrated in FIG. 1 viewing in the direction of the arrow II therein.

As can be seen from FIG. 2, a spring member 42 is disposed between the two braking members 30. The spring member 42 which for example is as illustrated in the form of a coil compression spring causes the two braking members 30 to be urged away from each other in diametrally opposite directions. Each of the two braking members 30 has a blind hole as shown at 44 in FIG. 5, into which the spring member 40 extends with a suitable end portion as indicated at 46 in FIG. 5.

Figure 3:
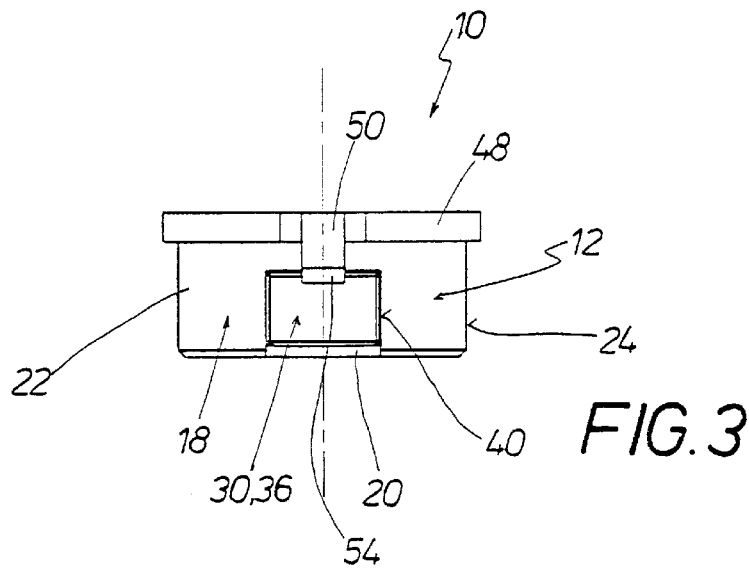
FIG. 3 is a view of the arrangement illustrated in FIG. 2 viewing in the direction of the arrow III therein.
Figure 4:
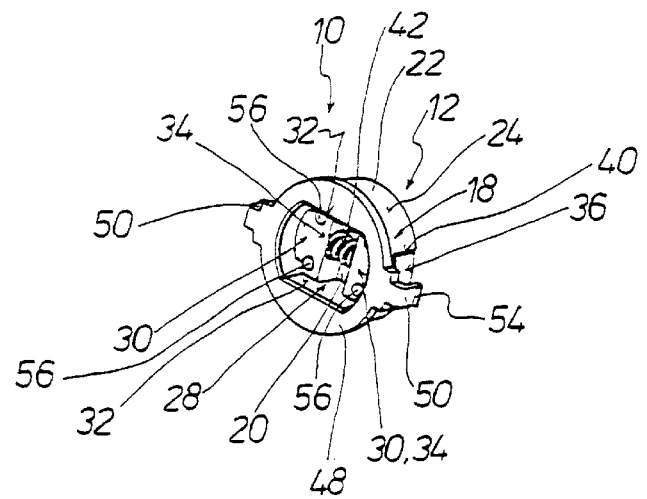
FIG. 4 is a perspective view of the arrangement shown in FIGS. 1 through 3.
Figure 5:
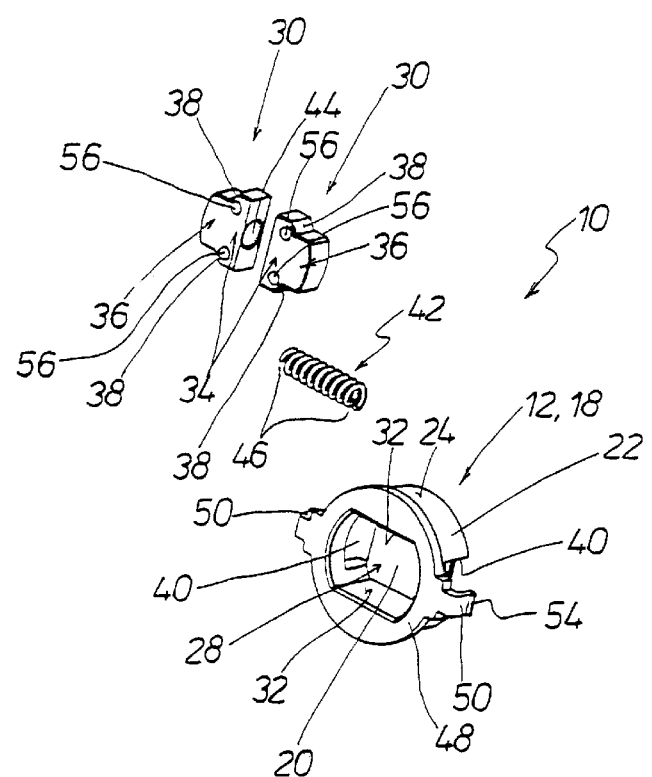
FIG. 5 is a perspective exploded view of the arrangement shown in FIG. 4.

At its upper edge which is axially opposite to the end portion 20, the flange 22 of the casing 18 has a peripherally extending collar as indicated at 48 in for example FIGS. 1 and 3. The casing 18 of the arrangement 10 can be axially accurately correctly fixed to the portion 16 by way of the collar 48.

Two resilient snap members 50 project away from the peripherally extending collar 48 at respective diametrally mutually opposite positions. The portion 16 is provided with two diametrally oppositely disposed holes as are indicated at 52 in FIG. 1, into which the resilient snap members 50 are inserted in such a way as to extend thereinto and therethrough, until the snap members 50 are latched with hook elements 54 at their front ends, behind the portion 16, in a condition of engagement with the surface thereof which is towards the rotatable element 14. In that way, the arrangement 10 which defines the axis 12 for the rotatable element 14 is secured to the portion 16 in a defined position.

By virtue of the presence of the braking members 30 which are resiliently urged away from each other by the spring member 42, with the braking portions 36 engaging into and appropriately through the holes 40 in the flange 22, so as to be capable of engaging with the adjacent surface of the rotatable element 14, the illustrated configuration forms for the rotatable element 14 a braking assembly which, in a temperature range for example of between −40° C. and +100° C., involves a constant torque and thus a constant operating force with which the rotatable element 14 is rotatable about the axis 12.

In the region of their guide and abutment portions 34, the braking members 30 are each provided with holes which can be most clearly seen at 56 in FIG. 2, which serve for the insertion of a tongs tool (not shown). The tongs tool can be used to move the braking members 30 towards each other when fitting the element 14 on the mounting configuration formed by the casing 18, so that the braking portions 36 of the braking members 30, during that fitting operation, do not project beyond the round external peripheral surface 24 of the peripheral flange 22 of the casing 18.

It will be appreciated that the braking property of the arrangement 10 can be adjusted as desired by virtue of suitable selection of the material for the braking members and the element 14 or by virtue of a suitable choice of the spring member 42, that is to say its spring rate.

It will further be appreciated that the braking principle can also be of a structurally reversed configuration.

It will be appreciated that the above-described embodiment of the arrangement according to the invention has been set forth solely by way of example and illustration of the principles of the invention and that various modifications and alterations may be made therein without thereby departing from the spirit and scope of the invention.

What is claimed is:

1. An arrangement for rotatably supporting an element rotatable about an axis, comprising a plug-shaped casing having a closed end portion and a peripherally extended flange therein extending away from the end portion and defining an opening in the casing opposite the closed end portion, the flange having a circular external peripheral surface forming a rotational mounting surface defining said axis for the rotatable element, the flange further defining therewithin a guide space communicating with the casing opening and having first and second diametrally mutually oppositely disposed holes through the flange, first and second braking members disposed in the guide space and facing diametrally away from each other, the braking members being removable from the guide space through the opening in the casing and further having braking portions which face diametrally away from each other and extend through respective ones of the first and second diametrally mutually oppositely disposed transverse holes through the flange, and a spring member operatively disposed between the first and second braking members and urging the braking members away from each other.

2. An arrangement as set forth in claim 1 wherein said holes in the flange of the casing steplessly adjoin said end portion of the casing.

3. An arrangement as set forth in claim 1 wherein said holes are of an internal cross-section adapted to the cross-section of the braking portions of the braking members.

4. An arrangement as set forth in claim 1 wherein each braking member has a guide and abutment portion adjoining its braking portion and guided in the guide space of the casing.

5. An arrangement as set forth in claim 4 wherein the guide space in the casing has first and second guide surfaces which are disposed in mutually parallel and opposite relationship and at which the braking members are linearly movably guided with their guide and abutment portions.

6. An arrangement as set forth in claim 1 wherein the flange of the casing has an edge which is in axially opposite relationship to the end portion of the casing, said edge having a peripherally extending collar.

7. An arrangement as set forth in claim 6 and further including at least first and second resilient snap members integrally provided on the collar and projecting away therefrom.

8. An arrangement as set forth in claim 1 wherein the braking members have a surface remote from the end portion of the casing, and holes in said surface for the insertion of a tongs tool.

* * * * *